(12) United States Patent
Chandrasekaran et al.

(10) Patent No.: US 11,858,858 B2
(45) Date of Patent: Jan. 2, 2024

(54) THREE-DIMENSIONAL PRINTING OF CERAMIC MATERIALS

(71) Applicant: LAWRENCE LIVERMORE NATIONAL SECURITY, LLC, Livermore, CA (US)

(72) Inventors: Swetha Chandrasekaran, Dublin, CA (US); James T. Cahill, Livermore, CA (US); Wyatt L. Du Frane, Livermore, CA (US); Joshua D. Kuntz, Livermore, CA (US); Richard L. Landingham, Livermore, CA (US); Ryan Lu, Daly City, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 481 days.

(21) Appl. No.: 17/015,403

(22) Filed: Sep. 9, 2020

(65) Prior Publication Data
US 2022/0073432 A1 Mar. 10, 2022

(51) Int. Cl.
*B33Y 70/00* (2020.01)
*C04B 35/622* (2006.01)
(Continued)

(52) U.S. Cl.
CPC ........ *C04B 35/62218* (2013.01); *B33Y 70/00* (2014.12); *B33Y 80/00* (2014.12); *C04B 35/6263* (2013.01); *C04B 35/6264* (2013.01); *C04B 35/63448* (2013.01); *C04B 2235/3813* (2013.01); *C04B 2235/3821* (2013.01); *C04B 2235/3839* (2013.01);
(Continued)

(58) Field of Classification Search
CPC .......... C04B 35/62218; C04B 35/6263; C04B 35/63448; C04B 2235/3813; C04B 2235/3821; C04B 2235/3839; C04B 2235/5436; C04B 2235/5445; C04B 2235/6026; B33Y 70/00; B33Y 80/00
See application file for complete search history.

(56) References Cited

U.S. PATENT DOCUMENTS 5,229,339 A * 7/1993 Pujari ............... C04B 35/63416
501/98.4
5,696,041 A * 12/1997 Collins .................. C04B 35/486
501/97.1
(Continued)

FOREIGN PATENT DOCUMENTS

KR 20170108305 A * 9/2017 ............. B29C 64/00

OTHER PUBLICATIONS

Costakis, Jr. et al., "Additive manufacturing of boron carbide via continuous filament direct ink writing of aqueous ceramic suspensions," Journal of the European Cermic Society, vol. 36, 2016, pp. 3249-3256.
(Continued)

*Primary Examiner* — Noah S Wiese
(74) *Attorney, Agent, or Firm* — James S. Tak

(57) ABSTRACT

An ink, and products formed from the ink, formulated at least in part from ceramic particles. The ink is formulated so that it can be used in additive manufacturing processes to form three-dimensional printed bodies. The three-dimensional printed bodies can have graded density and can be infiltrated by an infiltration material.

17 Claims, 12 Drawing Sheets

(51) Int. Cl.
    *C04B 35/626*    (2006.01)
    *C04B 35/634*    (2006.01)
    *B33Y 80/00*    (2015.01)
(52) U.S. Cl.
    CPC ............ *C04B 2235/5436* (2013.01); *C04B 2235/5445* (2013.01); *C04B 2235/6026* (2013.01)

(56) References Cited

U.S. PATENT DOCUMENTS

| | | | | |
|---|---|---|---|---|
| 7,795,349 B2 * | 9/2010 | Bredt | ............... | B33Y 70/00 |
| | | | | 525/193 |
| 2015/0099102 A1 * | 4/2015 | Sullivan | ............ | C09D 11/02 |
| | | | | 428/206 |
| 2018/0298215 A1 * | 10/2018 | Andersen | ............ | C04B 28/006 |

OTHER PUBLICATIONS

Feilden et al., "High temperature strength of an ultra high temperature ceramic produced by additive manufacturing," Ceramics International, vol. 45, 2019, pp. 18210-18214.
Lu et al., "Complex shaped boron carbides from negative additive manufacturing," Materials and Design, vol. 148, 2018, pp. 8-16.

* cited by examiner

Aluminum

Carbon

Oxygen

THREE-DIMENSIONAL PRINTING OF CERAMIC MATERIALS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing and more particularly to inks including ceramic materials for additive manufacturing, products constructed from inks including ceramic materials, and additive manufacturing processes using such inks.

BACKGROUND

The field of three-dimensional (3D) printed materials is evolving quickly to combine the geometric benefits of the 3D printing and beneficial properties of materials that would not conventionally be appropriate for 3D printing.

The material properties of extruded materials, including viscosity, commonly depend upon temperature. The viscosity of the material may be affected by fluid strain, and the material may exhibit shear-thinning or shear-thickening behavior. Ceramic materials often present significant obstacles for their use in additive manufacturing (AM), such as direct ink writing (DIW) processes, because ceramic materials generally do not flow well. Ceramic based inks that are usable in the formation of 3D structures that retain their shape while providing a sufficient concentration of ceramic material have remained elusive. Additionally, traditional ceramic materials cannot be used in additive manufacturing because those ceramic materials do not flow sufficiently to be extruded from a nozzle during printing.

A ceramic product must provide the desired characteristics of the ceramic material, but to benefit from the complex geometries possible to construct by additive manufacturing a suitable ink must be created. Thus, it would be desirable to create ceramic-based inks for additive manufacturing to form ceramic 3D printed parts that provide a high concentration of ceramic material while allowing sufficient flow to be extruded from a nozzle.

SUMMARY

An ink is formulated with ceramic particles and a viscosifier, and a solid loading of the ceramic particles has a high volume percentage and tailored to provide rheological properties to obtain shear thinning. The ink can be used in additive manufacturing processes to form products from the ceramic material. In at least some embodiments, the ceramic material is an ultra-high temperature ceramic material.

An ink for additive manufacturing includes an aqueous suspension of ceramic particles, and at least one viscosifier. The aqueous suspension has a solid loading of the ceramic particles of at least 40 volume percentage (vol. %). The at least one viscosifier is configured to increase the viscosity of the aqueous suspension.

A method, according to another general embodiment, includes adding ceramic particles to deionized water, mixing the combination of ceramic particles and deionized water, and adding a viscosifier. The ceramic particles are added to the deionized water to form a combination of ceramic particles and deionized water. A quantity of the ceramic particles is added so that the combination has a solid loading of ceramic particles of at least 40 vol. %. The combination of ceramic particles and deionized water is mixed to disperse the ceramic particles in the deionized water to form an aqueous suspension. The viscosifier is added to the aqueous suspension to increase the viscosity of the aqueous suspension.

A three-dimensional printed body, according to another general embodiment, includes a plurality of stacked layers. Each of the plurality of stacked layers includes at least one extruded filament that is formed from an ink. The ink includes an aqueous suspension having a solid loading of ceramic particles of at least 40 vol. % and at least one viscosifier.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
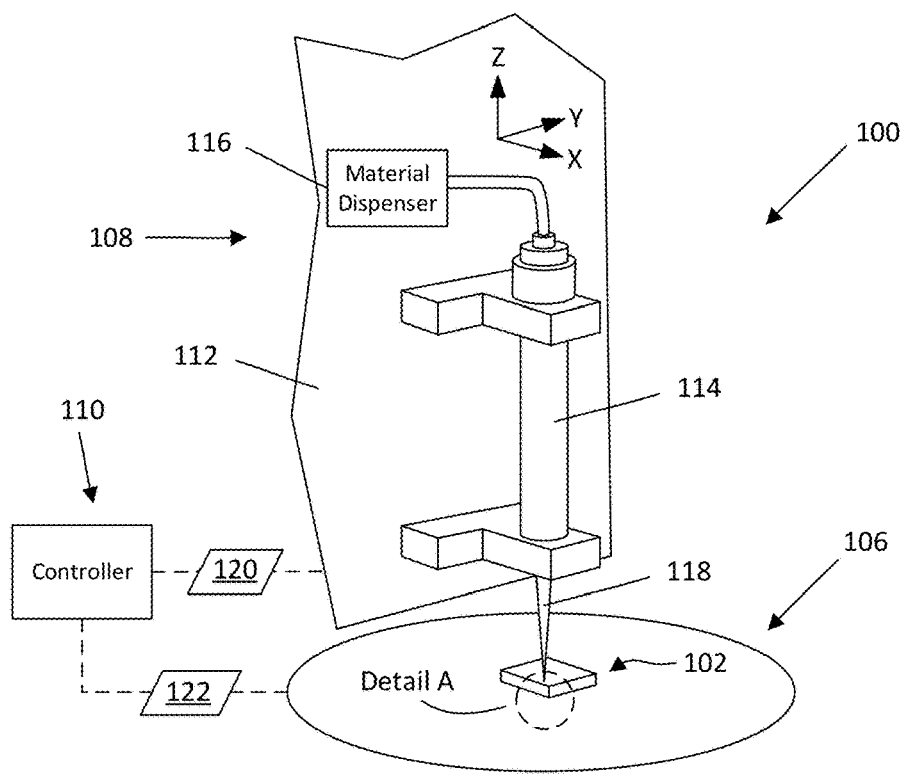
FIG. 1 is a perspective view of a direct ink writing apparatus.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The present disclosure includes several descriptions of exemplary "inks" used in an additive manufacturing process to form the 3D bodies described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer or filament that substantially retains its as-deposited geometry and shape without excessive sagging, slumping, or other deformation, even when deposited onto other layers or filaments of ink, and/or when other layers or filaments of ink are deposited onto the respective layer or filament. As such, skilled artisans will understand the presently described inks to exhibit appropriate rheological properties to allow the formation of monolithic structures via deposition of multiple layers or filaments of the ink (or in some cases multiple inks with different compositions and/or an ink with varying composition) in sequence.

The following description discloses several preferred structures that can be used to construct 3D printed products formed via additive manufacturing processes, such as direct ink writing (DIW), extrusion freeform fabrication, or other equivalent techniques. The 3D printed products exhibit unique structural and compositional characteristics conveyed via the precise control allowed by such printing techniques. In accordance with the invention, the 3D printed products can be infiltrated with one or more infiltration materials to form an infiltrated component.

The following description discloses several preferred embodiments of ceramic-based ink formulations and/or related systems and methods. In some examples, the ceramic-based ink formulations, and products formed therefrom, are constructed using ultra-high temperature ceramic materials. Examples of ultra-high temperature ceramic materials include boron carbide ($B_4C$), zirconium diboride ($ZrB_2$), hafnium carbide (HfC), hafnium diboride ($HfB_2$), zirconium carbide (ZrC) and silicon carbide (SiC). In some examples the ceramic-based ink formulations are configured so that they can be used to generate parts using direct ink writing in an environment that is maintained at room temperature.

Figure 2:
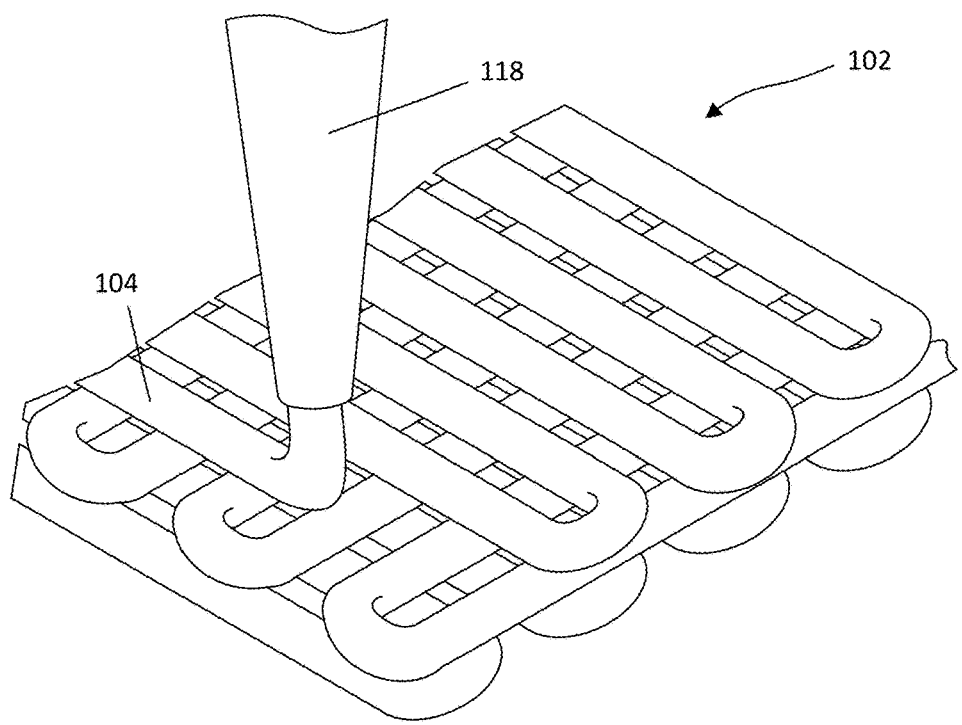
FIG. 2 is a perspective view of a portion of the direct ink writing apparatus of FIG. 1, shown by Detail A in FIG. 1.

Three-dimensional printed bodies can be printed using a direct ink writing technique. Referring to FIGS. 1 and 2, an apparatus 100 for direct ink writing a 3D printed body 102 is illustrated. Apparatus 100 is configured to extrude ink, in the form of a filament 104, onto a work surface that is supported by a print platform 106. In general, the apparatus 100 includes a print head 108, the print platform 106, and a controller 110. The print head 108 is configured to dispense ink based on signals sent from the controller 110.

The print head 108 generally includes a frame 112, a material reservoir 114, a material dispenser 116, and a nozzle 118. Frame 112 is a structure that is configured to support the material reservoir 114 and the nozzle 118. The material reservoir 114 and the nozzle 118 are in fluid communication so that ink can be fed from the material reservoir 114 to the nozzle 118. The material dispenser 116 is coupled to the material reservoir 114 and provides the driving force that forces material held in the material reservoir 114 to travel into, and through, the nozzle 118. In an example, the material reservoir 114 is a syringe barrel that is loaded with an ink formulation and coupled to the nozzle 118 by a Luer lock. The material dispenser 116 can be an air-driven dispenser that includes an air output fluidly coupled to the material reservoir 114 and configured to drive a piston in the material reservoir 114.

The print head 108 can also include one or more mechanisms configured to move the nozzle 118 relative to the print platform 106. For example, the frame 112 can include a fixed portion and a movable portion. An actuator can be incorporated into the frame 112 and interposed between the fixed portion and the movable portion and configured to translate and/or rotate the movable portion relative to the fixed portion. The actuator can be driven electromechanically, pneumatically, manually, or using combinations thereof.

The nozzle 118 is configured to discharge the ink from the material reservoir 114 in the form of filament 104. Filament 104 has a predetermined configuration that can be selected based on the desired configuration of the printed body 102 and the type of ink that is used. For example, the nozzle 118 can be configured to discharge the ink so that the filament 104 has a selected cross-sectional shape, such as a circular or polygonal cross-sectional shape. Additionally, the size of the nozzle 118 can be selected to provide a filament 104 having a desired size and to provide consistent flow of a selected ink. Various nozzles 118 can be selected and configured to deposit a filament having any size. In some embodiments, the size of the nozzle 118 can be selected relative to the size of the ceramic particles so that the ink is able to flow through the nozzle without clogging. In some embodiments, the nozzle 118 is configured to deposit a filament 104 having a diameter of at least 200 μm based on the ceramic particles of the ink. There is no upper limit on the filament size beyond the desired geometry of the printed product. In some embodiments, the nozzle 118 is configured to deposit a filament 104 having a diameter in a range between about 200 μm and about 800 μm. In at least one embodiment, the opening of the nozzle has a diameter of about 400 μm to form a filament having a diameter of about 400 μm. The extruded ink is selectively deposited under control of the controller 110 to progressively build the structure of the three-dimensional printed body 102.

The print platform 106 supports the work surface, and the work surface supports the ink that is deposited by the nozzle 118 during the construction of the printed body 102. In some embodiments, the work surface can be a part of the print platform 106. In other embodiments, the work surface can be a portion of a substrate that is mounted on the print platform 106. In at least some examples, the substrate can be a graphite substrate, glass, or any other hard surface. It should be appreciated that the substrate can be coated with a release agent such as petroleum jelly, or PTFE.

The print platform 106 can be configured to move the work surface so that relative motion between the nozzle 118 and the work surface can be provided. In an example, the print platform 106 can be a movable bed that is configured to translate the work surface in the direction of any, or all, of the X, Y, and Z axes. Additionally, the print platform 106 can be configured to rotate the work surface about any, or al, of the X, Y, and Z axes. A movable print platform 106 can be used in combination with, or as an alternative to, a print head 108 that includes a movable portion. The relative motion between the nozzle 118 and the work surface can be computer-controlled or manually operated, and the movement can be driven using electro-mechanical and/or pneumatic actuators.

The controller 110 is configured to communicate with the print head 108 and the print platform 106 and to provide instructions so that ink is deposited in a predetermined configuration on the work surface. For example, controller 110 is configured to provide instructions to print head 108 and print platform 106 that control relative motion between the nozzle 118 and the work surface. Controller 110 is also configured to provide instructions to the material dispenser 116 to control the delivery of the ink from the material reservoir 114 to the nozzle 118. Controller 110 can include one or more processors configured to send signals 120, 122 that include instructions to the print head 108 and the print platform 106, respectively, to control the ink delivery and relative movement. Using those signals, the controller 110 can be configured to control the print speed and print geometry while constructing the printed body 102.

The ink that is used to form the printed bodies described herein is generally an aqueous thixotropic ink that exhibits shear-thinning behavior. The ink can be tuned so that the flowability allows for the material to be effectively extruded from the nozzle while preventing excessive slumping of the extruded structure after the ink is deposited. Inks with a specific rheology used in 3D printing allow the resulting 3D printed structures to retain their shape for an extended period of time as a green body, i.e., before final curing. According to various embodiments, an ink is formulated to produce ceramic printed bodies that incorporates a high concentration of ceramic particles. The ink can be configured so that the printed structure does not exhibit warpage or distortion prior to a final cure, even after being subjected to drying. In various examples, an ink was formulated with a suspension of a ceramic particles having a high solid loading of ceramic particles. The ink formulations were also created to have simple compositions that provide a long storage life. For example, the ink formulations were designed to have a storage life was at least one week when stored in a refrigerator at a temperature in a range between 32° F. and 42° F.

Figure 3:
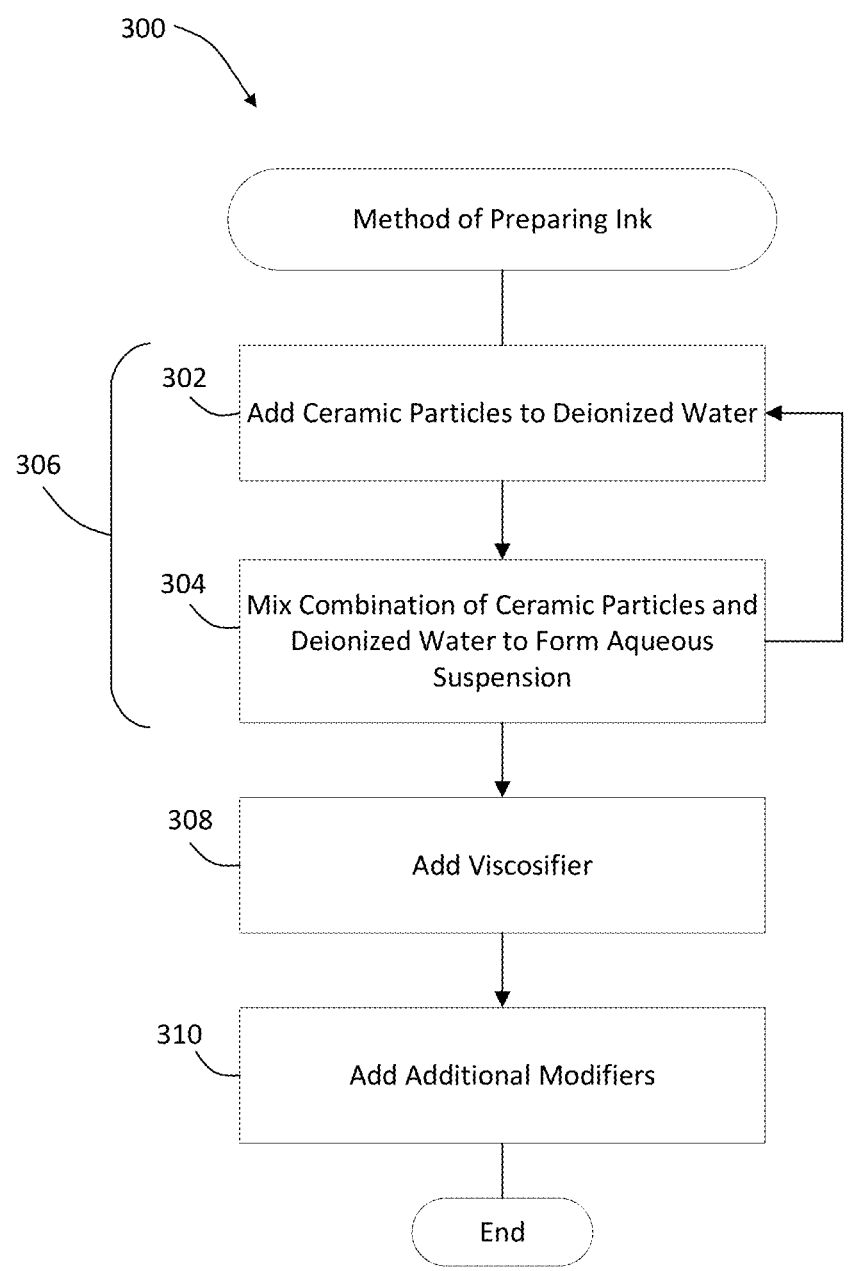
FIG. 3 is a flow chart showing a method of preparing ink in accordance with an embodiment.

FIG. 3 depicts a flowchart 300 of an example method of preparing an ink in accordance with at least one embodiment. The method of flowchart 300 can be used to generate an ink for use in a direct ink writing apparatus, such as the direct ink writing apparatus 100 shown in FIGS. 1 and 2, to produce 3D printed bodies. Further compositional, structural, and operational embodiments will be apparent to persons skilled in the relevant art(s) based on the discussion regarding flowchart 300.

As shown in FIG. 3, the method of flowchart 300 begins at step 302. In step 302, ceramic particles are added to deionized water as a first step in creating an aqueous suspension. The ceramic particles have a selected size, or selected combination of sizes, and are formed from a selected ceramic material that is the desired ceramic material for the 3D printed body.

Particles formed from a variety of ceramic materials, and having a variety of sizes, can be selected to form the aqueous suspension. The type and size of ceramic particles utilized to formulate the ink can be selected to provide the desired attributes of the final product, such as strength, coefficient of thermal expansion, mass, etc. In some embodiments, the selected ceramic material can be selected to construct a printed body formed from an ultra-high temperature ceramic material so that the printed body can be subjected to subsequent high temperature processes and/or high temperature environments. In various examples, an ultra-high temperature ceramic is selected so that the printed body offers geometric and physical stability at temperatures exceeding 2000° C. Examples of ceramic materials that can be used to form the ink include, but are not limited to, various borides, carbides, nitrides, and oxides. In some embodiments, the ceramic material is selected from $B_4C$, $ZrB_2$, $ZrC$, $HfC$, and $HfB_2$.

The size of the ceramic particles can be selected based on the type of ceramic and a predetermined solid loading of the ceramic particles in the ink. In various embodiments, the ceramic particles include $B_4C$ particles that have sizes of 0.8-5 μm (e.g., 3000 F and 1500 F boron carbide particles produced by 3M Advanced Materials Division, of St. Paul, MN), and $ZrB_2$, $ZrC$, $HfC$, $HfB_2$ particles that have an average particle size in a range of 3-5 μm. In some embodiments, particles having different sizes can be combined. The combination of particle size can be selected based on weight. In at least one example, a combination of equal amounts of 1500 F. (~5 μm) and 3000 F. (~0.8 μm) $B_4C$ particles by weight (i.e., 50:50 by weight) was used to form an aqueous suspension having a particle concentration greater than 50 vol. %.

At step 304, the combination of the ceramic particles and the deionized water is mixed to disperse the particles throughout the water to form the aqueous suspension. The mixing can be accomplished using a mixing device, such as a planetary centrifugal mixer. In an example, the combination was mixed using a planetary centrifugal mixer (e.g., an AR-250 mixer produced by Thinky U.S.A. of Laguna Hills, CA) at 2000 rpm for 2 minutes. A combination 306 of step 302 and step 304 can be repeated such as by incrementally adding ceramic particles to deionized water and mixing the combination until an aqueous suspension having a desired dispersion (e.g., uniform or near-uniform dispersion), and a desired particle load, is formed. In some embodiments, the ceramic particles are mixed with deionized water so that the resulting suspension has a ceramic particle solid loading that is greater than 40 vol. %. In some embodiments, the aqueous suspension has a ceramic particle solid loading that is in a range between 50 vol. % and 59.3 vol. %.

A dispersing agent can be added during the formation of the aqueous suspension to improve the dispersion of the ceramic particles in the aqueous suspension. In some examples, ceramic particles were suspended in deionized water containing polyethyleneimine (PEI). In addition to acting as an effective dispersing agent, the PEI molecules act as a green body binder due to its polycationic characteristics. As a result, the PEI can also improve the dimensional stability of the deposited ink before the printed body is subjected to a final curing step. In at least some examples, PEI having an average molecular weight of 25000 g/mol was included in the aqueous suspension.

At step 308, at least one viscosifier is added to the aqueous suspension to tune the viscosity and to formulate a printable ink. The viscosifier is added to the suspension to create an ink that has a desired balance between flowability through a nozzle and dimensional stability after deposition. In some examples the viscosifer is configured to increase the viscosity of the suspension and the amount of viscosifier added to the suspension is generally inversely proportional to the solid loading of the ceramic particles in the suspension. In examples of inks having relatively high volume percentage solid loading of ceramic particles in the suspension, i.e., having a ceramic particle solid loading greater than 40 vol. %, the amount of viscosifier required to formulate a printable ink is generally lower than known inks. In particular, the required amount of viscosifier is lower because of the increased viscosity of the suspension resulting from the higher particle loading prior to adding the viscosifier. In an example, Pluronic F-127 was used as a viscosifier and added to the suspension. Pluronic F-127 can be used to form a stiff hydrogel during mixing due to its amphiphilic characteristic and the viscosifier acts as a surfactant to form a thixotropic paste that can be printed using a direct ink writing apparatus, such as apparatus 100 of FIG. 1. Additionally, the hydrogel formed using Pluronic F-127 is sensitive to temperature, so a resulting ink can be stored in a refrigerator to provide a longer shelf life. In an example, storing the ink in a refrigerator provides of shelf life of 1-2 weeks when the ink is held in a sealed container. The viscosifier can be chosen based on the cleanliness of its burn off to reduce the presence of materials form contaminants during curing.

The amount of viscosifier is selected to complement the viscosity of the aqueous suspension so that the final ink is printable. In various examples, the amount of viscosifier is in a range between about 1 weight % (wt. %) and about 18 wt. %. In other examples, the amount of viscosifier is in a range of between about 1 wt. % and about 8 wt. %. In still further examples, the amount of viscosifier is in a range of between about 4 wt. % and about 8 wt. %. In still further examples the amount of viscosifier is in a range of between about 1 wt. % and about 5 wt. %.

The amount of viscosifier can vary dependent on the type of ceramic particles used. In an exemplary ink formed with $B_4C$ particles, Pluronic F-127 was included in a range between 4 wt. % and 8 wt. %. In some examples, ink formed with $B_4C$ particles can include a viscosifier in a range between 6% and 8%. In exemplary Zr-based inks formed with $ZrB_2$ or ZrC particles, Pluronic was included in a range of between about 1 wt. % and about 5 wt. %. In exemplary Hf-based inks formed with HfC or $HfB_2$ particles, Pluronic was included in a range of between about 1 wt. % and about 5 wt. %. In some examples, ink formed with denser particles, such as $ZrB_2$ or $HfB_2$, can include a viscosifier in a range between 3% and 5%.

At step 310, additional modifiers can be added to alter other attributes of the ink such as chemical, rheologic, or other physical attributes. For example, a pH modifier can be added to alter the pH of the ink to change the working, or open, time of the ink. In some embodiments, the ink is formulated to have a target working time greater than 10 minutes, in some examples the target working time is about 20 minutes. Suitable pH modifiers include, but are not limited to, glacial acetic acid, hydrochloric acid, and nitric acid. In accordance with some embodiments, glacial acetic acid in a range of about 0.06 wt. % and about 2 wt. % can be added to reduce the overall pH of the suspension thereby increasing the working time so that drying of the suspension was avoided to allow a longer time to prepare the thixotropic ink. In some embodiments, about 1 wt. % of glacial acetic acid can be added. A pH modifier may not be desired depending on the type of ceramic particles used to formulate the ink because inks formulated with some ceramic particles have less of a tendency to dry out which would otherwise reduce the working time to print. For example, a pH modifier can be advantageous for inks based on boron carbide, while a pH modifier may not be advantageous for inks based on Zr or Hf. In an example, ink was formulated with boron carbide using about 1 wt. % glacial acetic acid to modify the pH of the ink.

Furthermore, the additional modifiers can include additives that form a hydrogel. The hydrogel-forming additives can be water soluble. The hydrogel-forming additives can include cellulose and polyethylene glycol.

Figure 4:
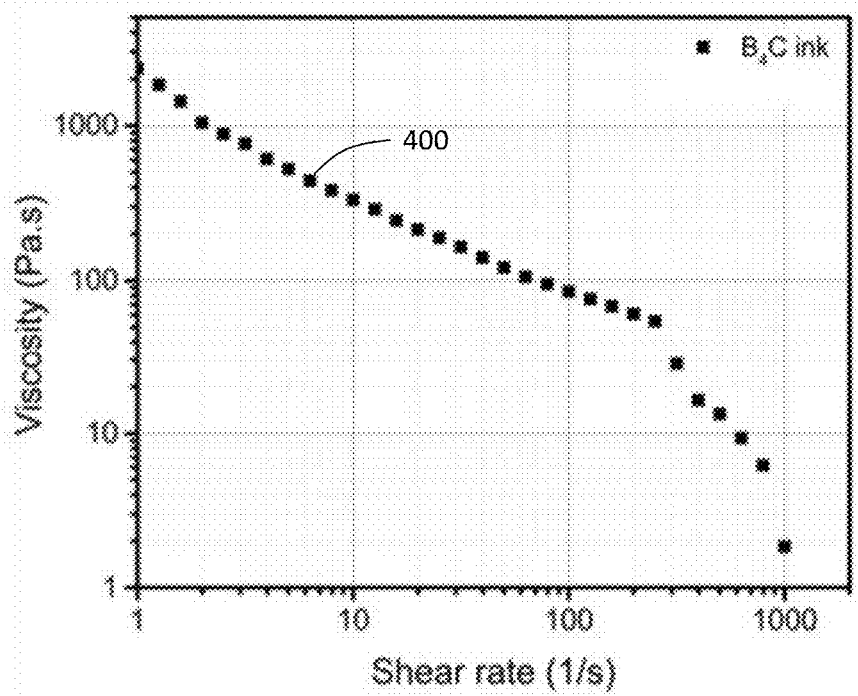
FIG. 4 is a graph illustrating a plot of viscosity of an ink including ceramic material as a function of shear rate, according to one illustrative configuration of the present invention.

Rheological characteristics can be used to describe the behavior of inks. Referring to FIG. 4, a curve 400 illustrating the viscosity of an exemplary $B_4C$ ink is illustrated relative to shear rate. As shown in FIG. 4, the ink can be formulated to have a generally shear-thinning behavior which is characterized as having viscosity that decreases with an increase in shear rate. As a result, the ink is configured to flow through a conical nozzle and retains its shape immediately after deposition. In particular, as shown in FIG. 4, the viscosity of the ink dropped as a function of shear rate, until about 100 (1/s) and then drastically decreases at higher shear rates.

Figure 5:
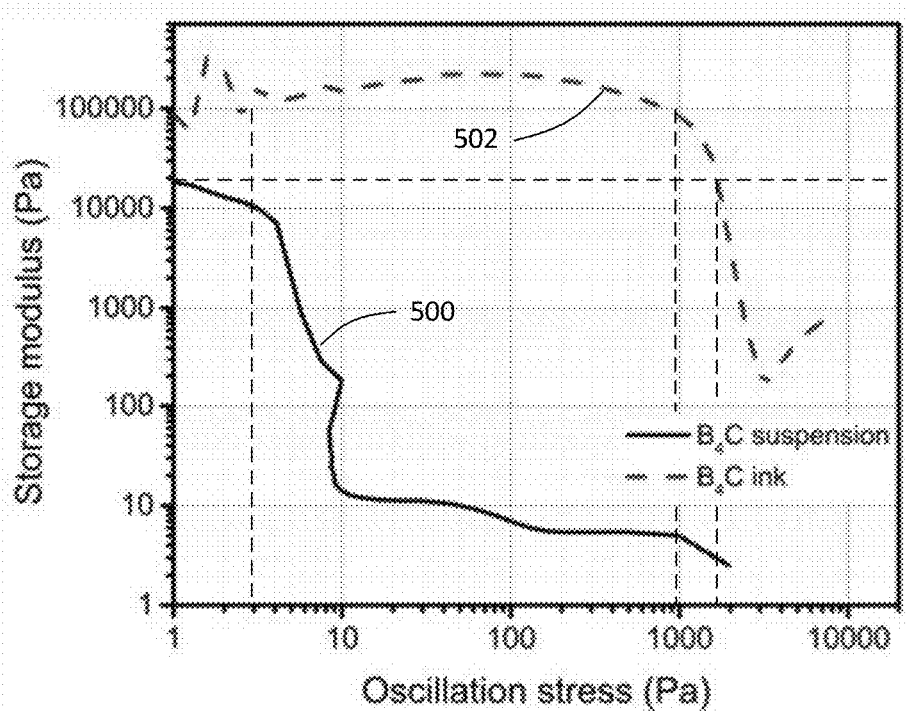
FIG. 5 is a graph illustrating a plot of storage modulus of the ink described in FIG. 4 as a function of oscillatory stress.

It is desirable that inks used for DIW are formulated to provide sufficient stiffness to withstand the built-up structure of DIW, in addition to exhibiting shear thinning and high viscosity. Referring now to FIG. 5, a comparison of storage modulus relative to oscillation stress is shown for an aqueous suspension created with $B_4C$ particles and for an ink formulated with the suspension created with $B_4C$ particles. The curve 500 is shown for the exemplary $B_4C$-based suspension in comparison to a curve 502 for the exemplary $B_4C$-based ink. The storage modulus is a measure of elastic response of the ink and measures the stored energy in the ink and can be used to predict slumping behavior of the ink. As is apparent from the graph of FIG. 5, the addition of at least one viscosifier to the suspension to form an ink results in an increase in the storage modulus over a large range of oscillation stress.

As illustrated in FIG. 5, the exemplary ink demonstrates a larger storage modulus over a wide range of oscillation stress compared to the exemplary suspension. The ink exhibits a longer elastic plateau with a constant storage modulus of about 100 kPa until a shear stress of about 1000 Pa, i.e., the storage modulus of the exemplary ink remains over about 100 kPa over a range of oscillation stress up to about 1000 Pa. The storage modulus of the exemplary ink also remains above the maximum storage stress of the exemplary suspension (~20 kPa) for all oscillation stress values below a value of about 1800 Pa. The storage modulus of the exemplary suspension drops drastically from greater than about 10 kPa to below 20 Pa over a range of oscillation stress between about 3 Pa and about 10 Pa and remains below 20 Pa at oscillation stresses greater than about 10 Pa.

The inks described above can be used in DIW processes to construct three-dimensional printed bodies. In preparation for direct ink writing, the formulated ink is loaded into a material reservoir of a DIW apparatus, such as material reservoir 114 of DIW apparatus 100. As an example, the material reservoir can be a syringe barrel. The loading of the ink into the material reservoir can include steps to prevent print defects, such as performing additional mixing processes to remove air bubbles in the ink. In an example, the ink is loaded into a 10 ml syringe barrel and centrifuged at a rate of 4500 rpm for one minute to remove air bubbles. After loading the ink, the material reservoir is loaded into a print head of a direct ink writing apparatus, such as print head 108 of apparatus 100 described above.

The material reservoir is coupled to a material dispenser, such as material dispenser 116 of apparatus 100 as shown in FIG. 1. The material dispenser is configured to force the ink from the material reservoir, through a nozzle, and onto a work surface of the direct ink writing apparatus. The material dispenser can be configured to drive a piston in a syringe barrel using pressurized air to force the ink from the material reservoir. In an example embodiment, the fluid dispenser applies pressurized air in a range of 30-45 psi.

The material dispenser forces the ink to be extruded through a nozzle that is fluidly coupled to the material reservoir. For example, the ink can be extruded through nozzle 118 of apparatus 100, shown in FIG. 1. The nozzle is selected to extrude the ink in the form of a filament having desired dimensions. In an example, the nozzle is a smooth-flow tapered micro nozzle having an inner diameter that tapers from about 600 µm to about 400 µm, and an outlet having a diameter of about 400 µm. In example embodiments, the nozzle can be coupled to the material reservoir by a removable coupling, such as a Luer lock.

The ink is deposited onto a work surface that can be provided on a print platform, such as print platform 106 of DIW apparatus 100, or can be provided by a substrate coupled to the print platform. The work surface can be treated, such as with a lubricant or other release material, to limit the adhesion between the extruded ink and the work surface. In an example, the work surface was provided by a graphite substrate and petroleum jelly was spread on the surface to reduce the adhesion between the printed ink and the substrate after the ink was dried.

The speed that the ink is deposited on the work surface, i.e., the writing speed, can be controlled by a controller, such as controller 110 of DIW apparatus 100. The writing speed can be varied throughout the process of constructing a printed body. In various embodiments, the writing speed can be maintained in a range of 1-10 mm/s. In some examples, the writing speed was maintained at about 5 mm/s.

After the ink is deposited on the work surface and formed into a 3D printed body, the printed body can be air dried. In an example, the 3D printed body was dried in ambient air overnight and later in an oven at a temperature of 80° C. for 24 hours to remove water from the deposited ink.

An additional step of curing the 3D body can be performed to remove binders, additional water, and any other volatile compounds that are present in the deposited ink. The additional step of curing can include heat treating the 3D printed body in an inert gas environment. In an example, the additional step of curing can include heat treating the 3D printed body at 1050° C. for 1 hour in flowing 4% Hz/Argon gas.

Figure 6:
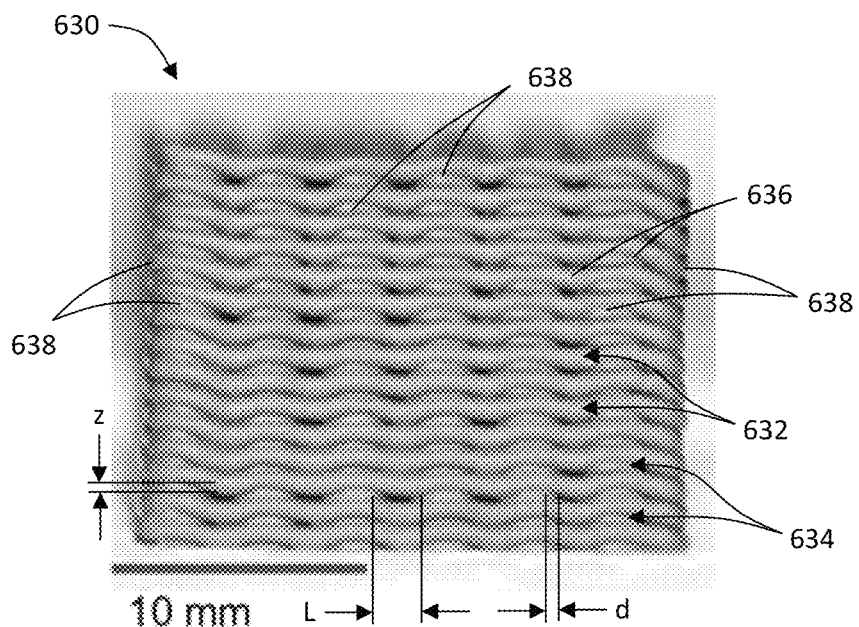
FIG. 6 is a side view of a printed body, according to an illustrative embodiment of the present embodiment.

The 3D printed bodies constructed using ink formulation described above can have many different configurations. Referring first to FIG. 6, an example of a 3D printed body 630 is constructed from a plurality of layers having alternating configuration. The 3D printed body 630 is configured as a simple cubic lattice with multiple orthogonal layers of parallel cylindrical filaments, or rods, that were printed alternately. As shown, 3D printed body 630 is constructed from a of plurality of first layers 632 alternately stacked with a plurality of second layers 634. Each of the first layers 632 has a first configuration formed by a plurality of parallel filaments 636 having a first orientation. Each of the second layers 634 has a second configuration that is different than the first configuration. The second configuration is formed by a plurality of parallel filaments 636 having a second orientation that is different than the first orientation. In the illustrated example, the first orientation is orthogonal to the second orientation, and the center-to-center spacing (L) of the filaments is constant for all of the first layers 632 and the second layers 634. It should be appreciated that the center-to-center spacing of the filaments can be varied throughout the 3D printed body to vary the density of the printed material throughout the structure, thereby creating a graded density. In the illustrated example, adjacent parallel filaments are constructed as a continuous bead of material in which the adjacent filaments 636 are coupled by a return 638 that is formed when the direction of travel of the nozzle of a DIW apparatus is reversed while depositing ink. It should be appreciated that incorporating an intermittent flow of ink and altering the pattern of printing of the 3D printed body can be used so that the returns 638 are omitted from the structure.

In some examples, the diameter (d) of each filament 636 equals a diameter of the opening in the nozzle used to deposit the ink. The inter-layer z-spacing (z), i.e., the center-to-center distance between adjacent layers resulting from the distance the nozzle is moved in the z-direction between layers, is less than the diameter of the filaments 636 so that each subsequently deposited layer is effectively pressed into the prior layer during printing to ensure good connectivity and adhesion between successive layers. In some examples the z-spacing is selected to be less than the diameter of the filaments 636, such as in a range of 50%-70% of the diameter of the filaments 636. In at least one example, the z-spacing is selected to be about 60% of the diameter of the filaments 636. For example, for a 400 µm diameter nozzle the z-spacing can be 240 µm, and for a 800 µm diameter nozzle the z-spacing can be 480 µm. The z-spacing can also be controlled in combination with the nozzle size and number of layers to vary the overall height of the 3D printed body.

Figure 7:
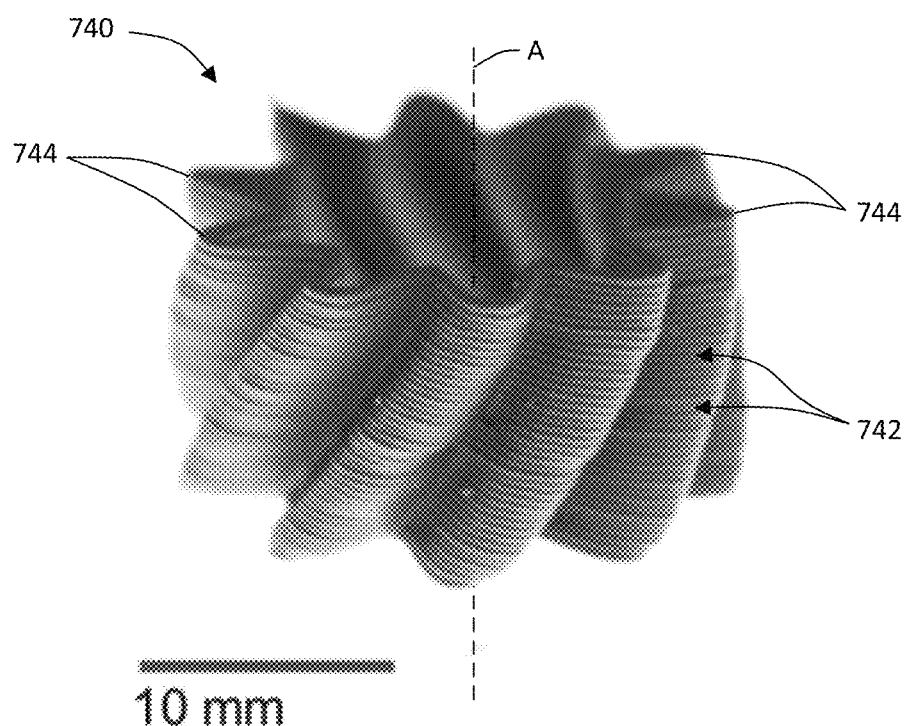
FIG. 7 is a perspective view of a printed body, according to another illustrative embodiment of the present invention.

Referring to FIG. 7, another example of a 3D printed body constructed from an ink formulation described herein using a DIW apparatus will be described. In particular, a 3D printed body 740 is generally constructed as a helical spline. The printed body 740 includes a plurality of repeated layers 742 having different orientations. Each layer 742 is constructed as a single filament of ink extruded into the shape of a gear, or star, having a plurality of teeth 744, or cogs. In the illustrated embodiment, each layer 742 is shaped as a gear having ten (10) teeth 744. The layers 740 are oriented so that each layer 742 is rotated relative to the adjacent layer 742 about a longitudinal axis A to form the helical spline structure. It should be appreciated that the 3D printed body can be constructed as distinct sequentially printed layers.

Figure 8:
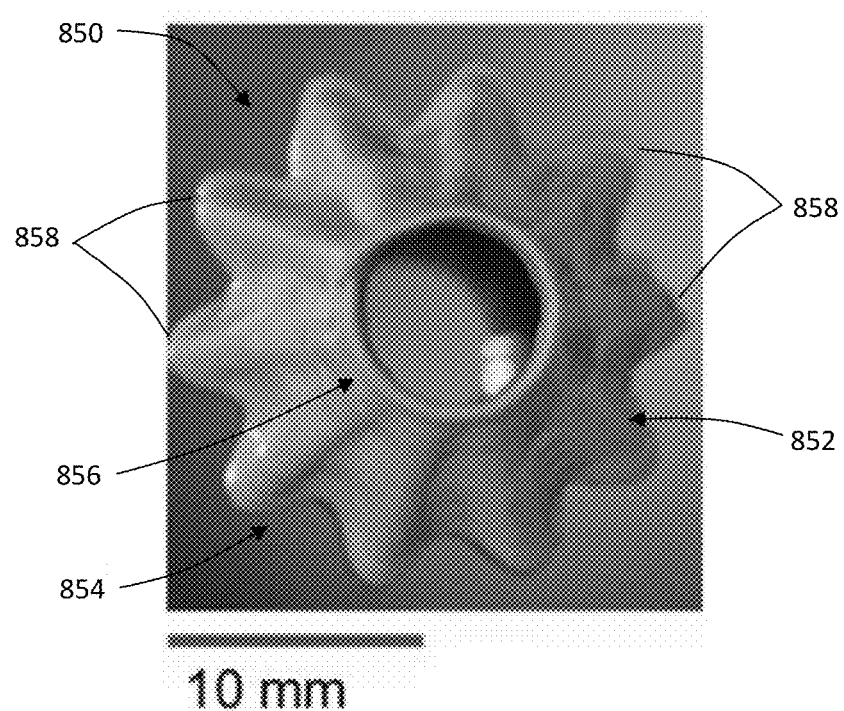
FIG. 8 is a top view of a printed body, according to another illustrative embodiment of the present invention.

Referring to FIG. 8, another example of a 3D printed body constructed from an ink formulation described herein using a DIW apparatus will be described. In particular, a 3D printed body 850 is generally constructed as a fluted cone. The printed body 850 includes a plurality of layers 852 having different sizes and configurations. The shapes of layers 852 transition from a first shape at a first end 854 to a second shape at a second end 856. The layers 852 also have a maximum outer dimension that varies from the first end 854 to the second end 856. The shape of the layers generally transitions from the shape of a gear closest to the first end 854 to the shape of a circular ring closest to the second end 856. As shown, the gear shape includes a plurality of teeth 858 (e.g., 10 teeth as shown). The transitioning shape and outer dimension results in the flutes and taper that form the fluted conical shape of the 3D printed body 850.

Figure 9:
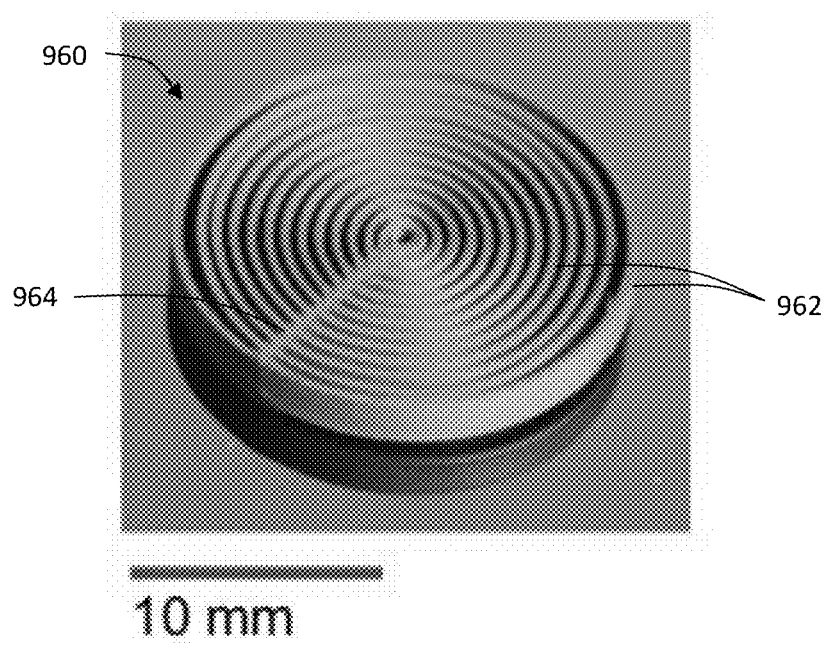
FIG. 9 is a perspective view of a printed body, according to one illustrative embodiment of the present invention.

Referring to FIG. 9, a still further example of a 3D printed body constructed from an ink formulation described herein using a DIW apparatus will be described. In particular, a 3D printed body 960 is constructed as a ring structure including a plurality of concentric rings 962 that are coupled by a radial rib 964. The concentric rings 962 are spaced by an inter-ring spacing that can be constant, or variable, through the construction. It should be appreciated that although only a single radial rib is illustrated, a plurality of radial ribs can be included.

The 3D printed bodies produced using the inks, methods, and structures described herein can be combined with other materials to form components for larger systems. For example, the printed bodies can be used to provide a scaffolding for an infiltration material to construct an infiltrated component. As an example, a 3D printed body constructed using a ceramic-based ink can be infiltrated with a metallic material to form an armor plate component used in a lightweight armor system.

Figure 10:
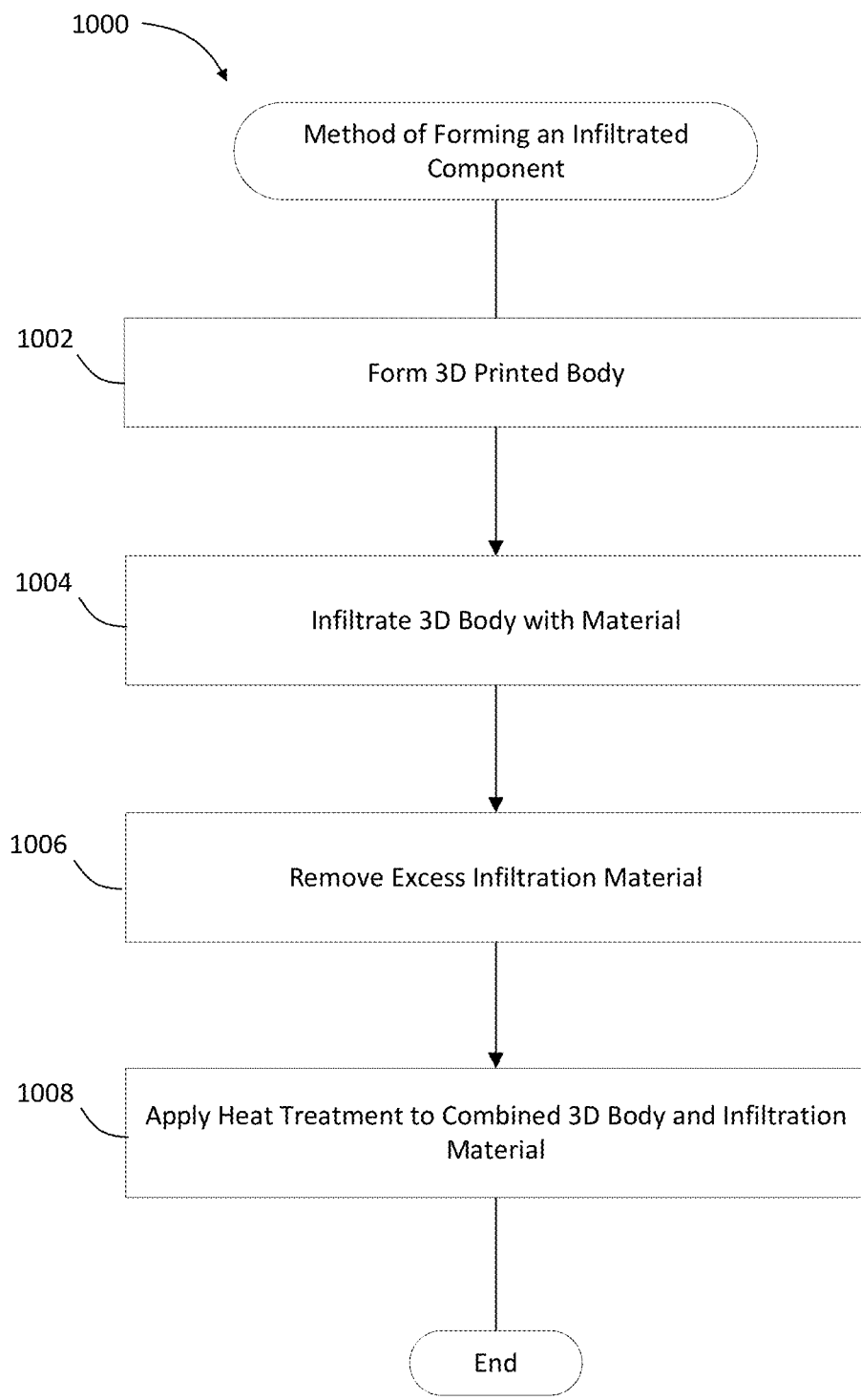
FIG. 10 is a flow chart illustrating a method of forming an infiltrated component in accordance with an embodiment.

FIG. 10 depicts a flowchart 1000 of an example method of forming an infiltrated component in accordance with at least one embodiment. The method of flowchart 1000 can be used to infiltrate a 3D printed body, such as the printed bodies described herein, using an infiltration material. Steps included in the method of forming an infiltrated component are also shown schematically in FIG. 11. Further compositional, structural, and operational embodiments will be apparent to persons skilled in the relevant art(s) based on the discussion regarding flowchart 1000.

As shown in FIG. 10, the method of flowchart 1000 begins at step 1002. In step 1002, a 3D printed body that is configured for infiltration of a molten material is formed. The 3D body can have many different configurations, such as for example any of the configurations described herein, including the configurations shown in FIGS. 6-9, the configurations shown in FIG. 11, or the configurations shown in FIGS. 12 and 13. In at least some examples, the 3D printed body can have a lattice structure that is configured to interact with the molten material so that the infiltration of the molten material through the 3D printed body can be driven, at least in part, by capillary action. Gravity or pressure are other means for infiltrating 3D printed bodies. A 3D printed body constructed for infiltration of the molten material can also include a graded density, such as the graded density shown in 3D printed body 1280a of FIG. 12 and 3D printed body 1280b of FIG. 13. The graded density is produced by varying the density of the ceramic material throughout the 3D printed body structure.

Figure 12:
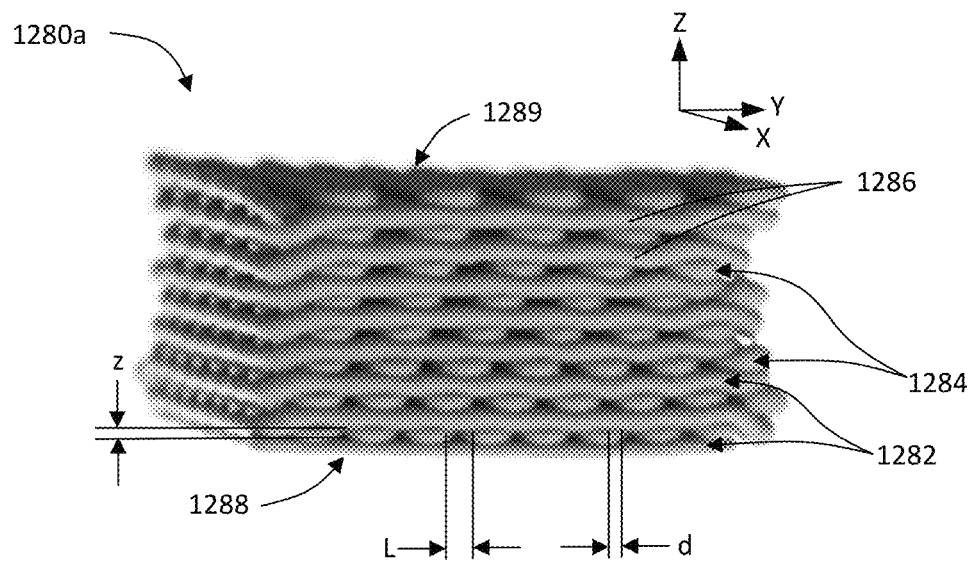
FIG. 12 is a side view of a printed body used to create an infiltrated component, according to an illustrative embodiment of the present invention.
Figure 13:
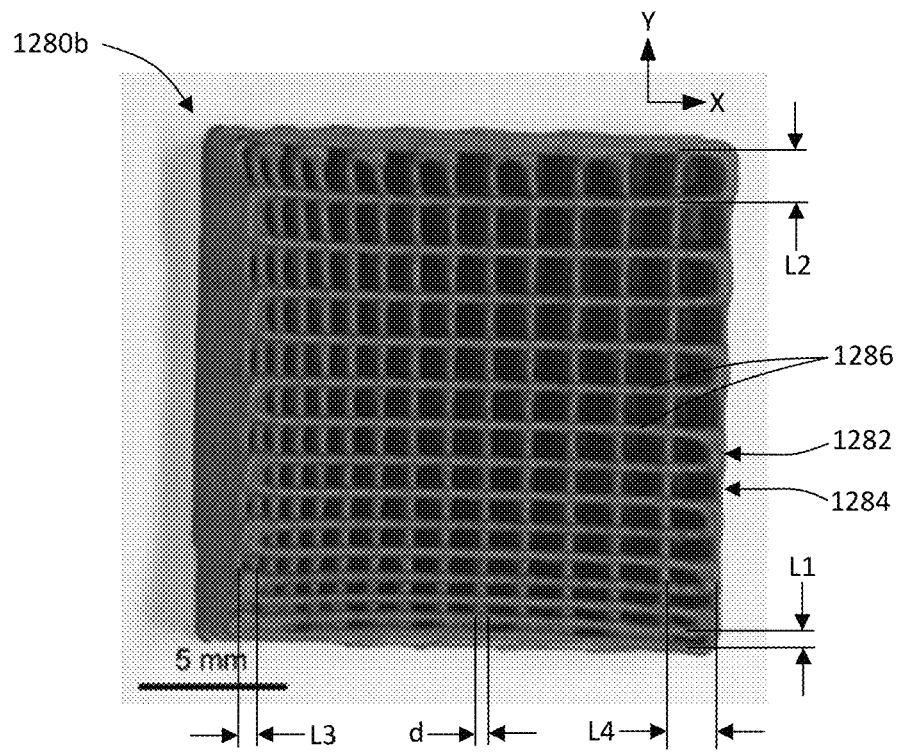
FIG. 13 is a top view of the printed body of FIG. 12.

As shown in FIGS. 12 and 13, the 3D printed bodies 1280a,b have constructions similar to the 3D printed body 630 of FIG. 6. In particular, the 3D printed bodies 1280a,b are configured as cubic lattices with multiple orthogonal layers of parallel cylindrical filaments that were printed using an ink comprising $B_4C$. However, the filaments used to construct the 3D printed body 1280a, shown in FIG. 12, vary in center-to-center spacing between layers throughout the 3D body 1280a so that the 3D printed body 1280a has a graded density that changes from higher density in the lower layers to lower density in the upper layers in the Z-axis direction. The filaments used to construct the 3D printed body 1280b, shown in FIG. 13, vary in center-to-center spacing between layers and within each layer throughout the 3D body 1280b so that the 3D printed body 1280b has a graded density that changes from higher density in the lower left corner of FIG. 13 to lower density in each of the positive X and Y directions from that corner. Each of the 3D printed bodies 1280a,b is constructed from a of plurality of stacked first layers 1282 and second layers 1284. Each of the first layers 1282 and the second layers 1284 is constructed from filaments 1286 that are spaced by a center-to-center distance (L). The center-to-center distance between adjacent filaments that can vary within a layer and/or between different layers. Accordingly, the center-to-center spacing of the filaments throughout the 3D printed body can vary in directions parallel to the X-axis and/or the Y-axis. In a first layer 1282, such as the top layer shown in FIG. 13, the center-to-center spacing varies in a direction parallel to the Y-axis from a first spacing L1 to a second spacing L2 that is greater than the first spacing L1. Similarly, the center-to-center spacing between filaments 1286 in a second layer 1284, e.g., the layer immediately adjacent and below the top layer shown in FIG. 13, varies in a direction parallel to the X-axis from a third spacing L3 to a fourth spacing L4 that is greater than the third spacing L3. The center-to-center spacing between filaments in 3D bodies intended for infiltration was selected to be less than 1 mm to provide complete infiltration. In some embodiments, the center-to-center spacing was selected to be less than 800 μm, in some embodiments less than 600 μm, and in some embodiments less than 400 μm.

Additionally, the range of center-to-center spacing within the layers can vary throughout a thickness of the 3D printed body. For example, the range of center-to-center spacing can change dependent on the Z-axis position of the layers within the structure so that the average center-to-center spacing for each layer is different throughout the 3D printed body. As shown in FIG. 12, the lowest layer of the 3D printed body 1280a in the Z direction has an average center-to-center spacing that is smaller than an average center-to-center spacing of the layers positioned further in the +Z direction from the lowest layer, i.e., above the lowest layer. As a result, a density of the ceramic material decreases from a first end 1288 (i.e., the bottom layer) to a second end 1289 (i.e., the top layer) of the 3D printed body 1280a. In at least one embodiment, a gradient through the thickness of the 3D body was approximately 30% to 60% $B_4C$. In an example embodiment, the 3D body is constructed from layers each having a thickness equal to the thickness of the filament and an overall square plan shape having 0.75 inch (19.1 mm) sides that are stacked so that the 3D printed body 1280 has height of 0.3 inch (7.6 mm).

Referring again to FIG. 10, in step 1004 the 3D printed body is infiltrated with an infiltration material. The infiltration of the 3D printed body can be used to increase the overall density of portions of the 3D printed body. In an example embodiment, the 3D printed body 1280 was infiltrated with 6061-T6 aluminum to form a graded $B_4C$—Al cermet. The step of infiltrating the 3D body can be accomplished by subjecting the body to a vacuum environment in a furnace at, or above, a melting temperature of the desired infiltration material and placing the 3D body in contact with the infiltration material. It should be appreciated that the 3D printed body 1280 can be in a green state (i.e., a green 3D printed body) when infiltrated with the infiltration material.

Figure 11:
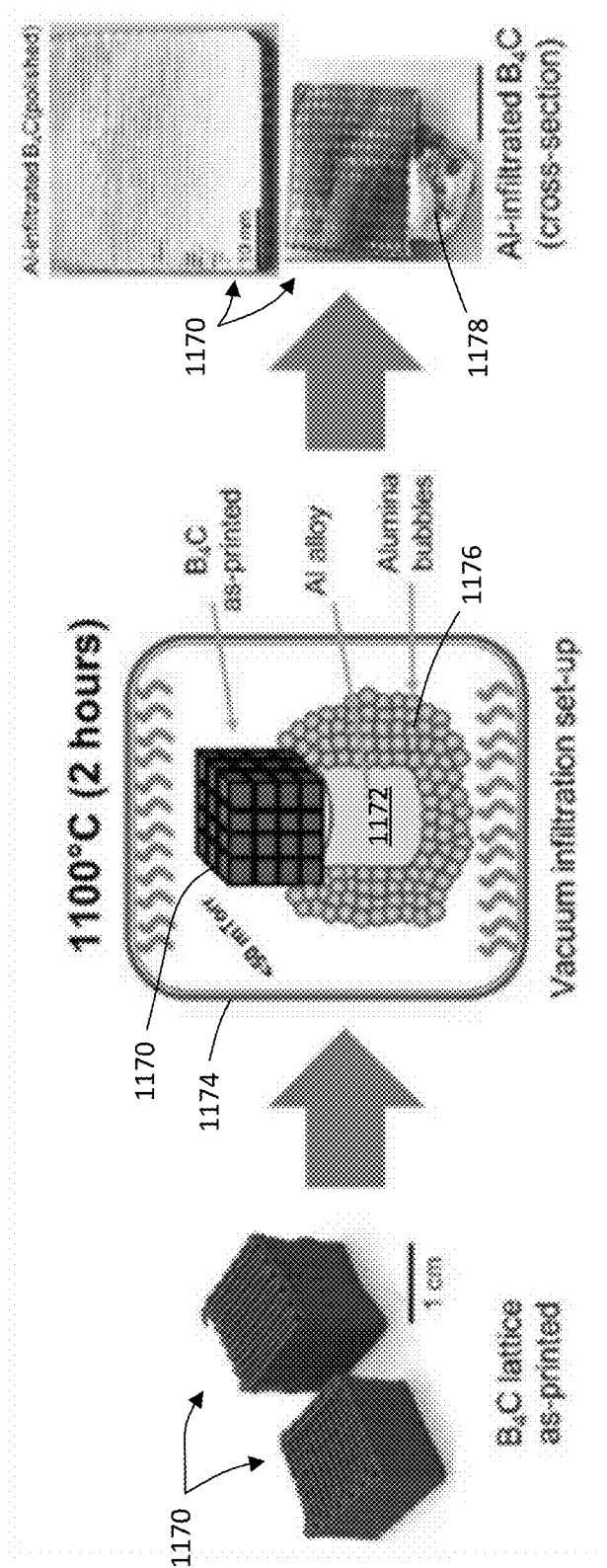
FIG. 11 is a schematic showing a method of creating an infiltrated component, according to one illustrative configuration of the present invention.

As shown in FIG. 11, the 3D body 1170 can be positioned in direct contact with a source of infiltration material 1172, such as 6061-T6 aluminum. In an example, the 3D printed body 1170 and the infiltration material 1172 were loaded into a furnace 1174. The furnace 1174 defined an environment that was controlled so that the infiltration material melted and flowed into the 3D printed body 1170 at a temperature of 1050° C. for 1 hour in vacuum of less than 90 mTorr. In an alternative embodiment, the 3D body 1170 and the infiltration material 1172 were placed in a furnace

1174 at a temperature of 1100° C. for 2 hours in vacuum of less than 50 mTorr, with a temperature ramp rate of 5° C./min. Alumina bubbles 1176 were also positioned in the furnace so that they were adjacent to and circumscribed at least a portion of the infiltration material to control movement of the molten infiltration material away from the 3D printed body 1170. The infiltration material 1172 was constructed to include a volume of infiltration material that was in a range between 110% and 125% of the porosity of the 3D body 1170 (i.e., void space volume) so that the amount of infiltration material provided would be sufficient to occupy the entire porosity, or void space, of the 3D body 1170. In an example embodiment, the infiltration material 1172 is provided in the form of a plate.

The 3D printed body can be oriented and positioned relative to the infiltration material source to alter the interaction between the printed body and the infiltration material. In at least one example embodiment, 3D body 1170 was oriented so that the layers of the 3D body 1170 having higher density (e.g., layers with center-to-center spacing of 100 µm) were positioned at the top and the lower density layers (e.g., layers with center-to-center spacing of 800 µm) were positioned at the bottom. The infiltration material 1172 can be placed against the top and bottom of the 3D printed body 1170 so that the molten infiltration material can fill the void space from both directions. Alternatively, the infiltration material can be placed against the top or the bottom of the 3D printed body.

In step 1006, excess infiltration material is removed. As shown in FIG. 11, after infiltrating the 3D printed body excess infiltration material 1178 can remain outside of the confines of the 3D printed body 1170. The excess infiltration material 1178 can be removed by material removal techniques such as machining, grinding, polishing, etc. In an example, a 120 µm grit grinding wheel was used to remove excess infiltration material 1178 and to flatten the infiltrated 3D printed body 1170.

Figure 14:
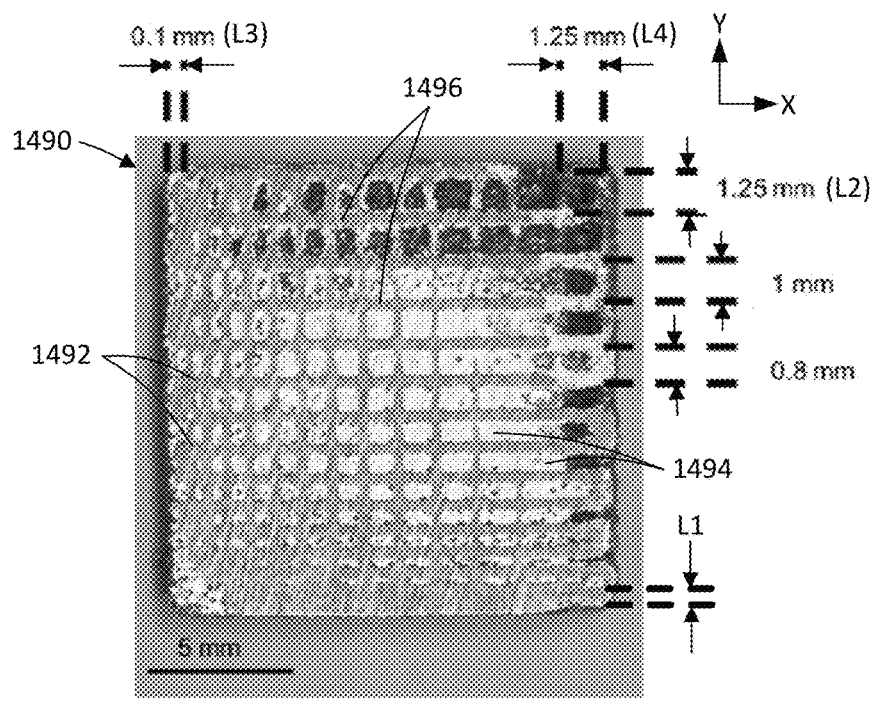
FIG. 14 is a top view of an infiltrated component, according to one illustrative embodiment of the present invention.

Referring to FIG. 14, an example of an infiltrated component 1490 will be described. The infiltrated component 1490 is constructed with a 3D printed body having the structure generally corresponding to that of 3D printed body 1280 shown in FIGS. 12 and 13 that has been infiltrated with an aluminum alloy. As shown by the image of FIG. 14, the gradation of the densities of the ceramic material 1492 and the infiltration material 1494 are visible. The center-to-center spacing between filaments 1496 of the ceramic material 1492 varies in a direction parallel to the Y-axis from a first spacing L1 of 0.1 mm to a second spacing L2 of 1.25 mm. Similarly, the center-to-center spacing between filaments in a second layer varies in a direction parallel to the X-axis from a third spacing L3 of 0.1 mm to a fourth spacing L4 of 1.25 mm. Because of the construction of the graded ceramic printed body, in the infiltrated component 1490, the density of the ceramic material 1492 (i.e., the density of the ceramic particles in the printed body) varies inversely relative to the density of the infiltration material 1494.

Figure 15:
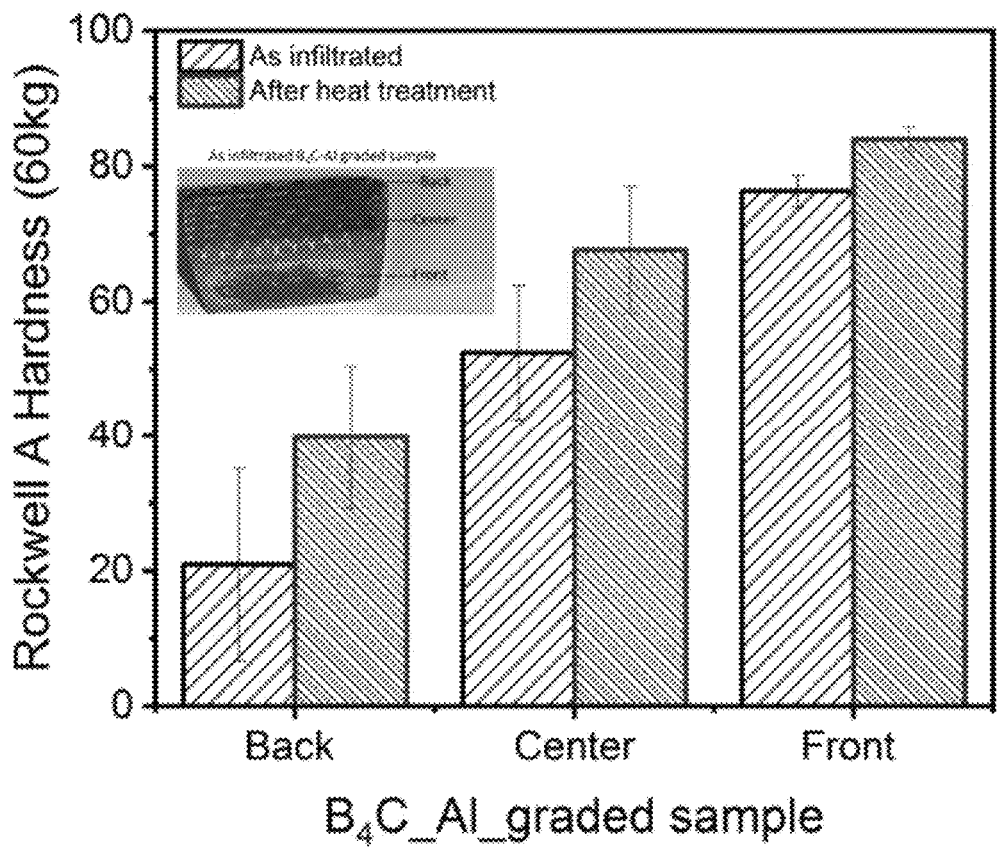
FIG. 15 is a graph comparing hardness before heat treatment and after heat treatment for an exemplary infiltrated component in accordance with an illustrative embodiment of the present invention.

As described above, the combined ceramic material and infiltration material form an infiltrated component, such as infiltrated component 1490 of FIG. 14. Referring back to FIG. 10, in step 1008 the infiltrated body can be heat treated to alter the physical attributes, such as hardness, of the infiltrated body. In an example, the infiltrated component was heat treated in air at 800° C. for 8 hours. Portions of the infiltrated component 1490 were hardness tested before and after applying the heat treatment. It was determined that in each of the portions, the hardness measurement increased after heat treatment as shown in FIG. 15. In particular, the hardness testing was performed at a front face, at the center, and at a back face of the infiltrated component. The front face corresponds to an end face of a portion of the infiltrated component 1490 having a higher ceramic density, such as end 1288 of 3D printed body 1280 shown in FIGS. 12 and 13, but a lower aluminum density. The back face corresponds to an end face of a portion of the infiltrated component 1490 having a lower ceramic density, such as end 1289 of 3D printed body 1280 shown in FIGS. 12 and 13, but a higher aluminum density. The center corresponds to an intermediate location within the 3D printed body. As shown by FIG. 15, the hardness of the infiltrated component 1490 measured at a plurality of locations on the infiltrated component generally increased at all locations after the infiltrated component 1490 was subjected to heat treatment. In an example, the hardness at the back face increased by about 47%, the hardness at the center increased by about 22%, and the hardness on the front side increased about 9%. Overall, the infiltrated component 1490 generally had hardness in a range between about 20 HRA and about 78 HRA in the Rockwell A scale before heat treatment, and hardness in a range between 40 HRA and 82 HRA in the Rockwell A scale after heat treatment.

The formulations and methods described herein can be used to construct components, such as infiltrated component described above, that are embedded with functionally graded materials that utilize lightweight materials. Those components can be constructed for extreme applications, including applications that absorb and disperse energy applied to a body by a projectile such as lightweight body armor. As described above, the components can be constructed, at least in part, utilizing scalable processes such as direct ink writing. The $B_4C$—Al cermet construction of the exemplary infiltrated component can be used to form monolithic armor plates that can be constructed with varying properties through the thickness of the armor plate. The hardness and fracture strength throughout the component can be controlled by controlling the densities of the $B_4C$ material and the aluminum material using the geometry of a 3D printed body and applying heat treatment to provide desired hardness in selected portions of the component. In an example of a $B_4C$—Al body armor component, the front face has high hardness to blunt the nose of an incoming projectile, an intermediate portion has improved fracture toughness to continue eroding the main body of the projectile, and a back side of the component requires tensile and fracture strength to support the impact and erosion sequence during the penetration of the projectile.

The infiltrated component having graded density that is constructed to achieve the desired properties and to be capable of maximizing the effect of the sequence of events applied to the projectile can be provided by constructing the selected graded material using the various techniques described herein. In an example of an infiltrated component used for light weight armor, direct ink writing can be used to deposit layers of $B_4C$ ceramic inks having different $B_4C$ densities ranging from 65% $B_4C$ at the front face to 40% $B_4C$ at a back face of the armor component. The density can be controlled either by controlling the quantity of ink that is deposited in each layer, such as by altering the spacing between filaments, or by changing the composition of the ink during printing. After the ink is deposited to form a 3D printed body, an aluminum alloy can be used as an infiltration material to produce fully dense structures. In some examples, the relative densities of the ceramic material and infiltration material are selected to provide a hardness gradient throughout the infiltrated body that varies from 20

HRA to 90 HRA. In other example embodiments the hardness gradient throughout the infiltrated body varies from 40 HRA to 70 HRA. In still further example embodiments, the hardness gradient throughout the infiltrated body varies from 600 to 1000 on a Vickers scale.

Figure 16A:
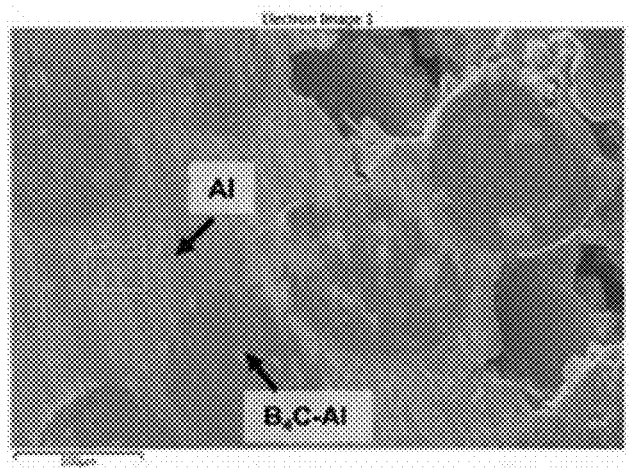
FIGS. 16A-F illustrate scanning electron microscope and energy-dispersive X-ray spectroscopy analysis of an exemplary embodiment of an infiltrated component in accordance with the invention.
Figure 16B:
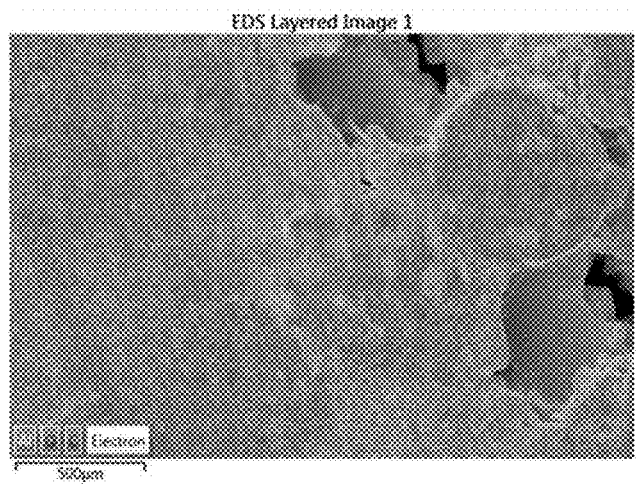
Figure 16C:
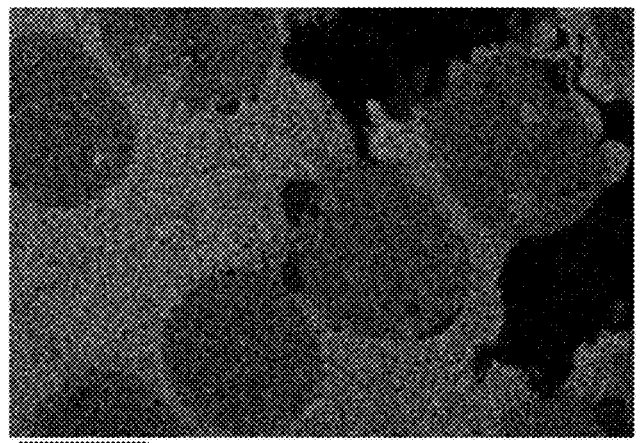
Figure 16D:
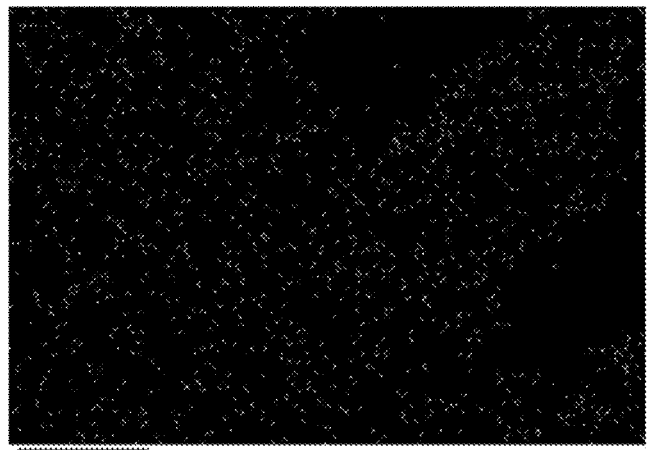
Figure 16E:
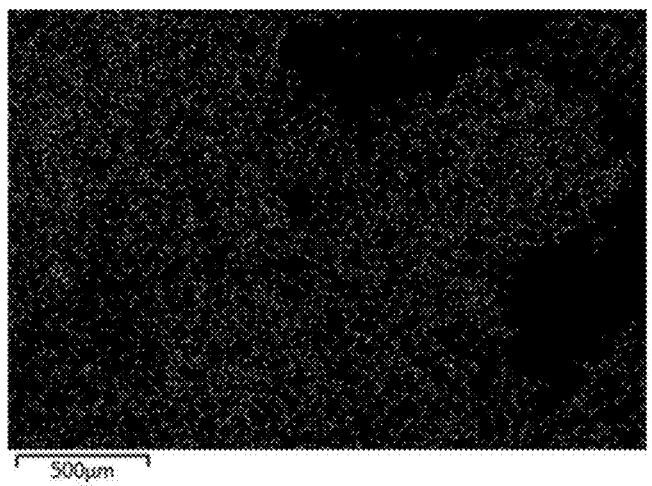
Figure 16F:
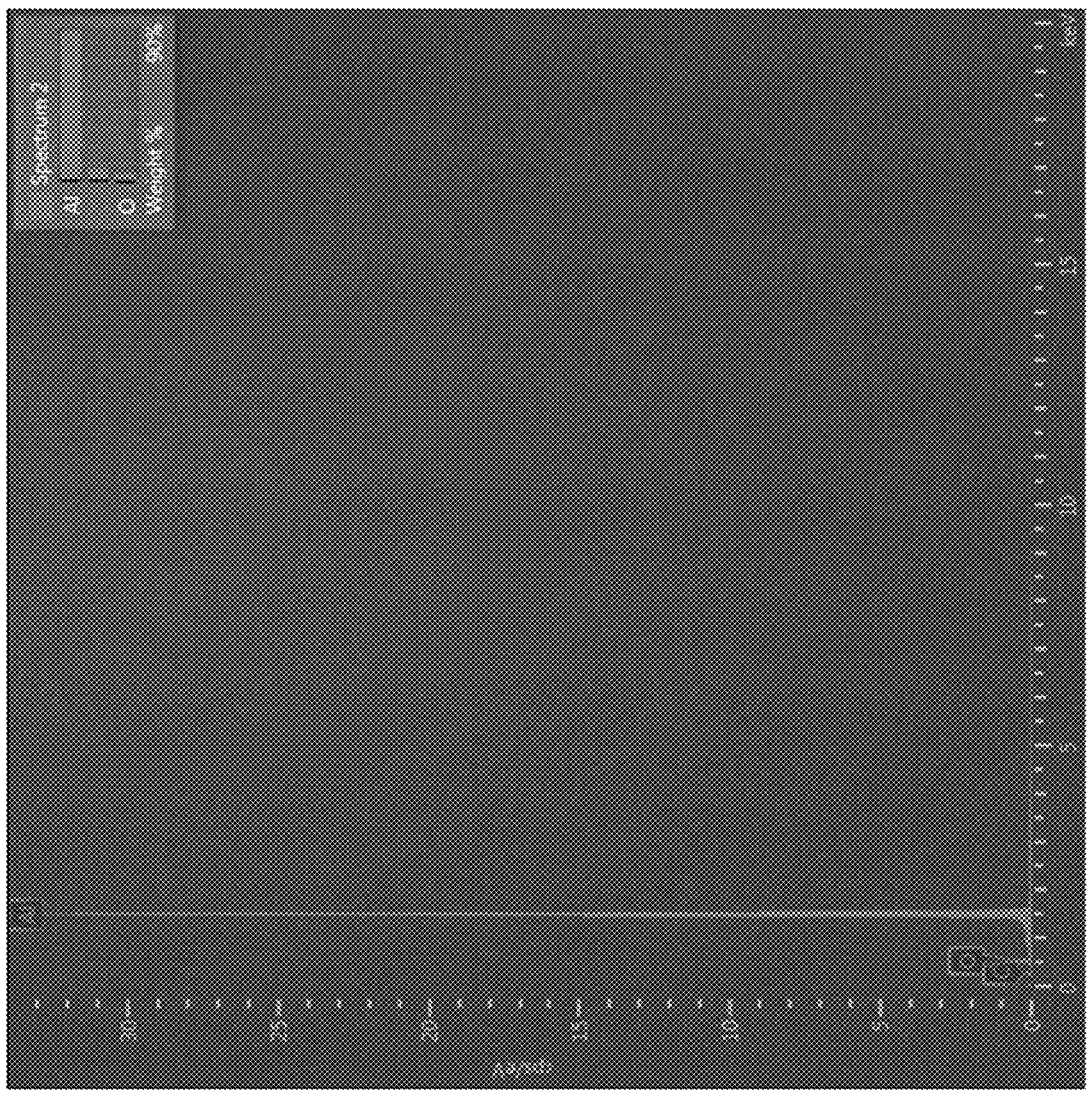

The chemical composition of the infiltrated component 1490 was analyzed using scanning electron imaging and energy-dispersive X-ray spectroscopy (EDS) techniques, the results of which are illustrated in FIGS. 16A-F. In particular, FIG. 16A is a magnified image of a portion of the infiltrated component 1490. FIG. 16B is an EDS layered image that illustrates the concentrations of aluminum, carbon, and oxygen in the portion of the infiltrated component 1490 of FIG. 16A. FIG. 16C illustrates the concentration of aluminum throughout the portion of the infiltrated component 1490 shown in FIG. 16A. Each of FIGS. 16D and 16E illustrates the concentration of carbon and oxygen, respectively, in the portion of the infiltrated component 1490 of FIG. 16A. Finally, FIG. 16F is a graph illustrating the EDS spectrum of the infiltrated component 1490.

The inventive concepts disclosed herein have been presented by way of example to illustrate the myriad features thereof in a plurality of illustrative scenarios, aspects, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. An ink for additive manufacturing, comprising:
an aqueous suspension of ceramic particles, wherein the aqueous suspension has a solid loading of the ceramic particles of at least 40 vol. %;
at least one viscosifier configured to increase the viscosity of the aqueous suspension; and
a pH modifier.

2. The ink of claim 1, wherein the solid loading of the ceramic particles is in a range between 50 vol. % and 59 vol. %.

3. The ink of claim 1, wherein the ceramic particles are formed from at least one ultra-high temperature ceramic material.

4. The ink of claim 1, wherein the ceramic particles are formed from at least one of $B_4C$, $ZrB_2$, $ZrC$, $HfC$, and $HfB_2$.

5. The ink of claim 1, wherein the viscosifier is a nonionic, surfactant polyol.

6. The ink of claim 1, wherein the viscosifier is provided in a range between 1 wt. % and 8 wt. %.

7. The ink of claim 1, wherein the viscosifier is provided in a range between 4 wt. % and 8 wt. %.

8. The ink of claim 1, wherein the ceramic particles have an average particle size in a range between 0.8 µm and 5 µm.

9. The ink of claim 1, further comprising a dispersing agent.

10. The ink of claim 9, wherein the dispersing agent is polyethyleneimine.

11. The ink of claim 1, wherein the pH modifier is glacial acetic acid.

12. A method of preparing ink, comprising:
adding ceramic particles to deionized water to form a combination of ceramic particles and deionized water, wherein a quantity of the ceramic particles is added so that the combination has a solid loading of ceramic particles of at least 40 vol. %;
mixing the combination of ceramic particles and deionized water to disperse the ceramic particles in the deionized water to form an aqueous suspension;
adding a viscosifier to the aqueous suspension to increase the viscosity of the aqueous suspension; and
adding a pH modifier to the aqueous suspension.

13. The method of claim 12, wherein the solid loading of the ceramic particles is in a range between 50 vol. % and 59 vol. %.

14. The method of claim 12, wherein ceramic particles are added incrementally to the deionized water and mixed to form the aqueous suspension.

15. The method of claim 12, wherein the viscosifier is a nonionic, surfactant polyol.

16. The method of claim 12, further comprising adding a dispersing agent to the deionized water.

17. The method of claim 12, wherein the pH modifier is glacial acetic acid.

* * * * *